US012749235B2

(12) United States Patent
Tomsia et al.

(10) Patent No.: US 12,749,235 B2
(45) Date of Patent: Sep. 29, 2026

(54) TECHNIQUES FOR AUTOMATIC IDENTIFICATION OF HARMONIOUS COLORS

(71) Applicant: L'Oreal, Paris (FR)

(72) Inventors: Thomas Tomsia, Rahway, NJ (US); Liwayway Piano, Piscataway, NJ (US)

(73) Assignee: L'Oreal, Paris (FR)

( * ) Notice: Subject to any disclaimer, the term of this patent is extended or adjusted under 35 U.S.C. 154(b) by 140 days.

(21) Appl. No.: 18/680,982

(22) Filed: May 31, 2024

(65) Prior Publication Data

US 2025/0371754 A1 Dec. 4, 2025

(51) Int. Cl.
*G06T 11/10* (2026.01)

(52) U.S. Cl.
CPC .......... *G06T 11/10* (2026.01); *G06T 2200/24* (2013.01)

(58) Field of Classification Search
CPC ...... G06T 2200/24; G06T 2207/10024; G09G 2340/06; G09G 5/06; G06F 3/14
See application file for complete search history.

(56) References Cited

U.S. PATENT DOCUMENTS 1,629,330 A 5/1927 Adler
10,964,064 B1 * 3/2021 Watling .............. G06F 16/5838
11,751,801 B2 * 9/2023 Rattner .................. A61B 5/443 600/306
2020/0379613 A1 12/2020 Chameleon
2023/0074782 A1 * 3/2023 Tendulkar .............. G06V 40/10
2024/0104795 A1 * 3/2024 Janeczko .............. G06T 11/001

FOREIGN PATENT DOCUMENTS

GB 288233 A 4/1928
WO 2023/245404 A1 12/2023

OTHER PUBLICATIONS

"Optical Society of America Uniform Color Scales (OSA-UCS)", https://www.handprint.com/HP/WCL/IMG/OSA/index.html, downloaded May 30, 2024, 4 pages.
French Search Report mailed Jan. 27, 2025, issued in corresponding French Application No. FR 2408489, filed Jul. 31, 2024, 2 pages.
"Understanding the CIE L*C*h Color Space", Konica Minolta, 2026, https://sensing.konicaminolta.us/us/blog/understanding-the-cie-lch-color-space/. Accessed Feb. 24, 2026.

* cited by examiner

*Primary Examiner* — Chante E Harrison
(74) *Attorney, Agent, or Firm* — Christensen O'Connor Johnson Kindness PLLC

(57) ABSTRACT

In some embodiments, a computer-implemented method of automatically determining harmonious colors is provided. A computing system receives a selection of a color, and uses the selected color to retrieve a cleavage surface in a uniform color space. The computing system presents one or more other colors from the cleavage surface as harmonious colors with respect to the selected color.

17 Claims, 4 Drawing Sheets

TECHNIQUES FOR AUTOMATIC IDENTIFICATION OF HARMONIOUS COLORS

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method of automatically determining harmonious colors is provided. A computing system receives a selection of a color, and uses the selected color to retrieve a cleavage surface in a uniform color space. The computing system presents one or more other colors from the cleavage surface as harmonious colors with respect to the selected color.

In some embodiments, a non-transitory computer-readable medium having computer-executable instructions stored thereon is provided. The instructions, in response to execution by one or more processors of a computing system, cause the computing system to perform actions for automatically determining harmonious colors, the actions comprising: receiving, by the computing system, a selection of a color; using, by the computing system, the selected color to retrieve a cleavage surface in a uniform color space; and presenting, by the computing system, one or more other colors from the cleavage surface as harmonious colors with respect to the selected color.

In some embodiments, a system is provided that comprises circuitry for receiving a selection of a color; circuitry for using the selected color to retrieve a cleavage surface in a uniform color space; and circuitry for presenting one or more other colors from the cleavage surface as harmonious colors with respect to the selected color.

BRIEF DESCRIPTION OF THE DRAWINGS

The foregoing aspects and many of the attendant advantages of embodiments of the present disclosure will become more readily appreciated as the same become better understood by reference to the following detailed description, when taken in conjunction with the accompanying drawings, wherein.

DETAILED DESCRIPTION

Figure 1:
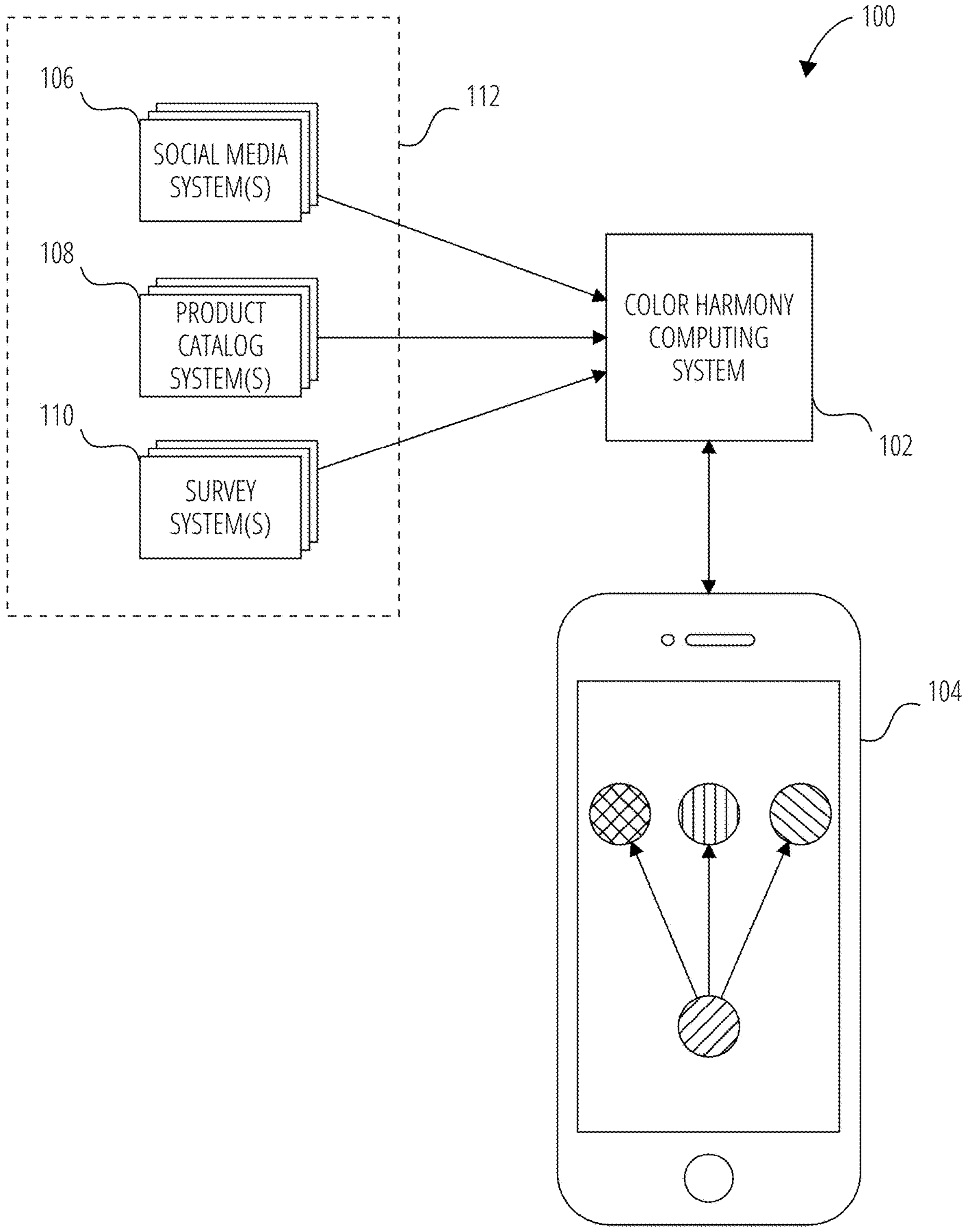
FIG. 1 is a schematic illustration of a system for automatically determining harmonious colors according to various aspects of the present disclosure.

One common way to organize colors for use in art, design, and other creative pursuits is a color wheel. A typical color wheel is the RYB color wheel, which is based on three primary colors (e.g., red, yellow, and blue), three secondary colors that are combinations of two primary colors (e.g., green, orange and purple), and six tertiary colors that are combinations of a primary color and a secondary color.

Color harmony is a characteristic of a combination of two or more colors that look pleasing next to each other. Typically, harmonious colors may be selected based on their relative positions on a color wheel. For example, colors directly across from each other (complementary colors), next to each other (analogous colors), next to a complementary color of a key color (split-complementary colors), equidistant from each other (triadic or square colors), and other arrangements on a color wheel are considered harmonious colors.

While color wheels do allow the selection of harmonious colors from a RYB color space (or other non-linear color space optimized for color reproduction), these color spaces can leave significant portions of the gamut of human color perception uncovered. Further, these color spaces are device dependent-since they specify colors as varying amounts of primary color contributions, device-specific implementations of the primary color contributions cause differences in absolute color produced by different devices.

To improve on these deficiencies in device-dependent color spaces, various device-independent color spaces have been developed by testing color perception under laboratory conditions. For example, the CIELAB color space (also known as L*a*b*) is a device-independent color space that defines colors in terms of a lightness value (L*), a value on a green-red axis (a*), and a value on a blue-yellow axis (b*). Since this color space defines the same color regardless of the device used to reproduce or sense the color, it is useful for color measurement and comparison. However, while the CIELAB color space covers the entire gamut of human color perception, it has been determined that it is not perceptually uniform throughout the entire gamut. As such, the CIELAB color space cannot be arranged in a geometry (e.g., a color wheel) that allows harmonious colors to be automatically identified based on their relative positions in the geometry. What is desired are techniques that can benefit from the wide gamut and cross-device compatibility of the CIELAB color space while nevertheless providing automatic identification of harmonious colors.

In some embodiments, the present disclosure leverages a uniform color space, such as the Optical Society of America Uniform Color Scales (OSA-UCS) color space, to automatically identify harmonious colors. A color specified in the CIELAB color space may be converted to an analogous color in the OSA-UCS color space, and a cleavage surface based on the analogous color may be used to identify the harmonious colors. As with the different relationships between harmonious colors in the color wheel (e.g., complimentary, analogous, etc.), a shape of the cleavage surface may be used to specify a desired subjective effect for the harmonious colors.

FIG. 1 is a schematic illustration of a system for automatically determining harmonious colors according to various aspects of the present disclosure. The system 100 includes a color harmony computing system 102 that collects information from a variety of harmonious color sources 112. The harmonious color sources 112 are sources of information that provide sets of colors that are considered harmonious, so that the color harmony computing system 102 can analyze these sets within the uniform color space.

Any suitable source of information regarding colors that are considered harmonious may be used as a harmonious color source 112. As illustrated, the harmonious color sources 112 include one or more social media systems 106, one or more product catalog systems 108, and one or more survey systems 110, though in other embodiments, more, fewer, or different types of sources may be used as harmonious color sources 112.

In some embodiments, a survey system 110 may be used to present combinations of colors to observers, and may collect feedback from the observers regarding whether the presented combinations of colors are harmonious or not harmonious. When the feedback indicates that the combinations of colors are harmonious, the associated combinations may be provided to the color harmony computing system 102 as sets of harmonious colors. In some embodiments, the survey system 110 may also collect sentiments from the observers regarding subjective effects of various color combinations, and the subjective effects may be provided to the color harmony computing system 102 along with the sets of harmonious colors.

In some embodiments, a product catalog system 108 may be used to provide sets of harmonious colors to the color harmony computing system 102. Typically, cosmetic products are organized into thematic groupings, or palettes, that are arranged by a designer or other creative talent to be aesthetically pleasing in combination. As such, it can be assumed that colors of products within a palette are harmonious with respect to each other, and information representing the colors of such products can be reused by the color harmony computing system 102. Palettes may also be accompanied by names, descriptions, or other information that describes a subjective effect sought by the designer of the palette. This subjective effect information may also be consumed by the color harmony computing system 102.

In some embodiments, social media systems 106 may be used to greatly increase the amount of data available to the color harmony computing system 102, though additional steps may be used to extract the desired information from such harmonious color sources 112. In a social media system 106 (e.g., Threads or Instagram by Meta; BlueSky; etc.), a post, story, or other unit of content may include an image of a "look," which includes a subject having a combination of clothing, accessories, hair style/color, skin tone, eye color, cosmetic product(s), and/or other notable characteristics. The unit of content may also include text describing the look. The color harmony computing system 102 may be configured to automatically detect colors of cosmetic products, hair, skin tone, eye color, clothing, etc., in the image, and may consider the automatically detected colors as a harmonious set of colors. The color harmony computing system 102 may also be configured to perform automatic sentiment analysis using natural language processing techniques in order to extract a subjective effect of the look in the image, and may associate the extracted subjective effect with the set of colors.

Once the color harmony computing system 102 has collected sets of harmonious colors, the color harmony computing system 102 may convert the harmonious colors to a uniform color space such as the OSA-UCS color space, and then determine a cleavage surface associated with each set of harmonious colors. A cleavage surface is a surface defined in the coordinate system of the uniform color space, and which identifies a plurality of colors within the uniform color space by virtue of the coordinates through which it passes. In some embodiments, the cleavage surface may be flat, in which case it may be referred to as a cleavage plane. In some embodiments, the cleavage surface may be curved, or may include one or more nonlinear plane segments. Since the cleavage surface encodes some commonality in perception of the colors it represents, once a cleavage surface is found based on a set of harmonious colors, other colors that are found on the cleavage surface will also be harmonious with the set of harmonious colors, thus allowing additional harmonious colors to be automatically identified.

Once cleavage surfaces that identify harmonious colors are identified, the color harmony computing system 102 may use it for any suitable purpose. One non-limiting example is illustrated in FIG. 1, wherein an end user computing device 104, such as a smartphone, displays a user interface provided by the color harmony computing system 102 (or based on information provided by the color harmony computing system 102). In the user interface, a user chooses a first color, and potentially a desired subjective effect. The color harmony computing system 102 may determine a cleavage surface within the uniform color space based on the first color and (optionally) the desired subjective effect, and may present one or more other colors from the cleavage surface as potential other harmonious colors with respect to the first color.

Figure 2:
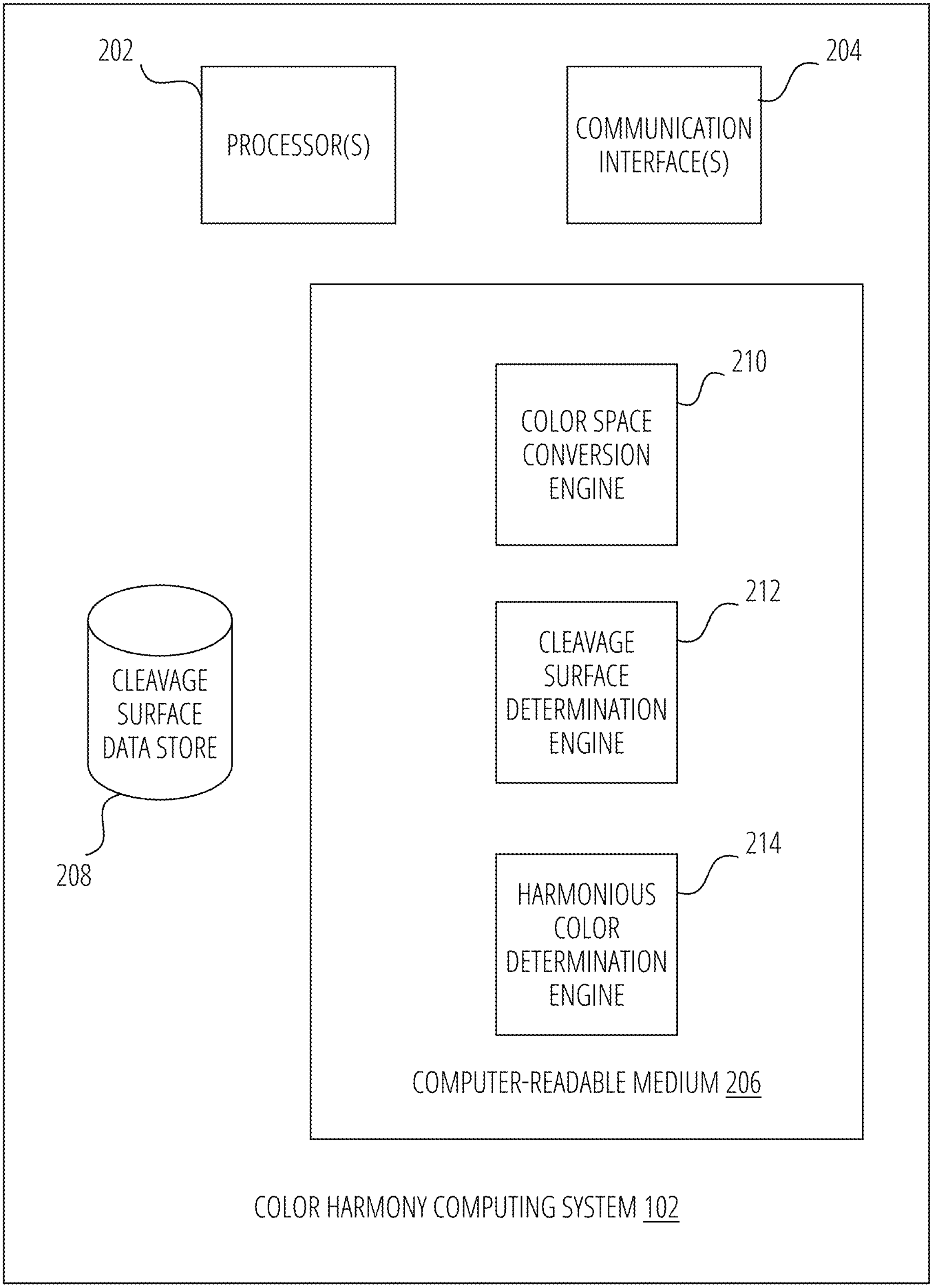
FIG. 2 is a block diagram that illustrates aspects of a non-limiting example embodiment of a color harmony computing system according to various aspects of the present disclosure.

FIG. 2 is a block diagram that illustrates aspects of a non-limiting example embodiment of a color harmony computing system according to various aspects of the present disclosure. The illustrated color harmony computing system 102 may be implemented by any computing device or collection of computing devices, including but not limited to a desktop computing device, a laptop computing device, a mobile computing device, a server computing device, a computing device of a cloud computing system, and/or combinations thereof. As described in further detail below, the color harmony computing system 102 is configured to automatically determine harmonious colors using a uniform color space, and to provide the automatically determined harmonious colors for a variety of purposes.

As shown, the color harmony computing system 102 includes one or more processors 202, one or more communication interfaces 204, a cleavage surface data store 208, and a computer-readable medium 206.

In some embodiments, the processors 202 may include any suitable type of general-purpose computer processor. In some embodiments, the processors 202 may include one or more special-purpose computer processors or AI accelerators optimized for specific computing tasks, including but not limited to graphical processing units (GPUs), vision processing units (VPUs), and tensor processing units (TPUs).

In some embodiments, the communication interfaces 204 include one or more hardware and or software interfaces suitable for providing communication links between components. The communication interfaces 204 may support one or more wired communication technologies (including but not limited to Ethernet, Fire Wire, and USB), one or more wireless communication technologies (including but not limited to Wi-Fi, WiMAX, Bluetooth, 2G, 3G, 4G, 5G, and LTE), and/or combinations thereof.

As shown, the computer-readable medium 206 has stored thereon logic that, in response to execution by the one or more processors 202, cause the color harmony computing system 102 to provide a color space conversion engine 210, a cleavage surface determination engine 212, and a harmonious color determination engine 214.

As used herein, "computer-readable medium" refers to a removable or nonremovable device that implements any technology capable of storing information in a volatile or non-volatile manner to be read by a processor of a computing device, including but not limited to: a hard drive; a flash memory; a solid state drive; random-access memory (RAM); read-only memory (ROM); a CD-ROM, a DVD, or other disk storage; a magnetic cassette; a magnetic tape; and a magnetic disk storage.

In some embodiments, the color space conversion engine 210 is configured to receive colors in a non-linear color space and to convert them to the uniform color space. In some embodiments, the cleavage surface determination engine 212 is configured to use sets of harmonious colors to determine cleavage surfaces within the uniform color space that include the harmonious colors, and that can thereafter be used to determine additional harmonious colors. The cleavage surface determination engine 212 may store the determined cleavage surfaces in the cleavage surface data store 208. In some embodiments, the harmonious color determination engine 214 is configured to retrieve an appropriate cleavage surface from the cleavage surface data store 208 when presented with an input color, and to output one or more other colors that are harmonious with respect to the input color using the cleavage surface. Further description of the configuration of each of these components is provided below.

As used herein, "engine" refers to logic embodied in hardware or software instructions, which can be written in one or more programming languages, including but not limited to C, C++, C#, COBOL, JAVA™, PHP, Perl, HTML, CSS, Javascript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into an application-specific integrated circuit (ASIC), a field-programmable gate array (FPGA), or another hardware device.

As used herein, "data store" refers to any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

Figure 3A:
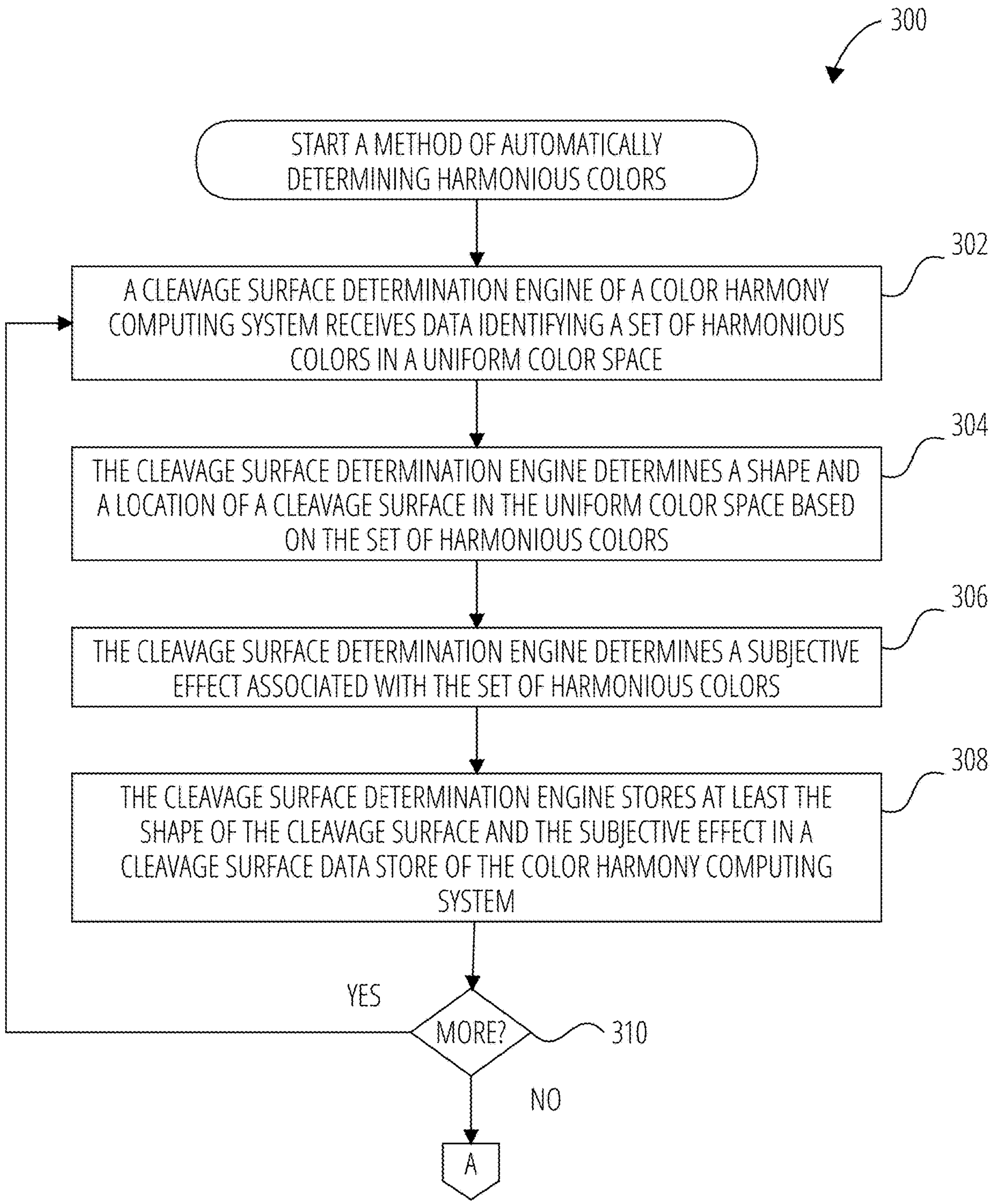
FIG. 3A-FIG. 3B is a flowchart that illustrates a non-limiting example embodiment of a method of automatically determining harmonious colors according to various aspects of the present disclosure.
Figure 3B:
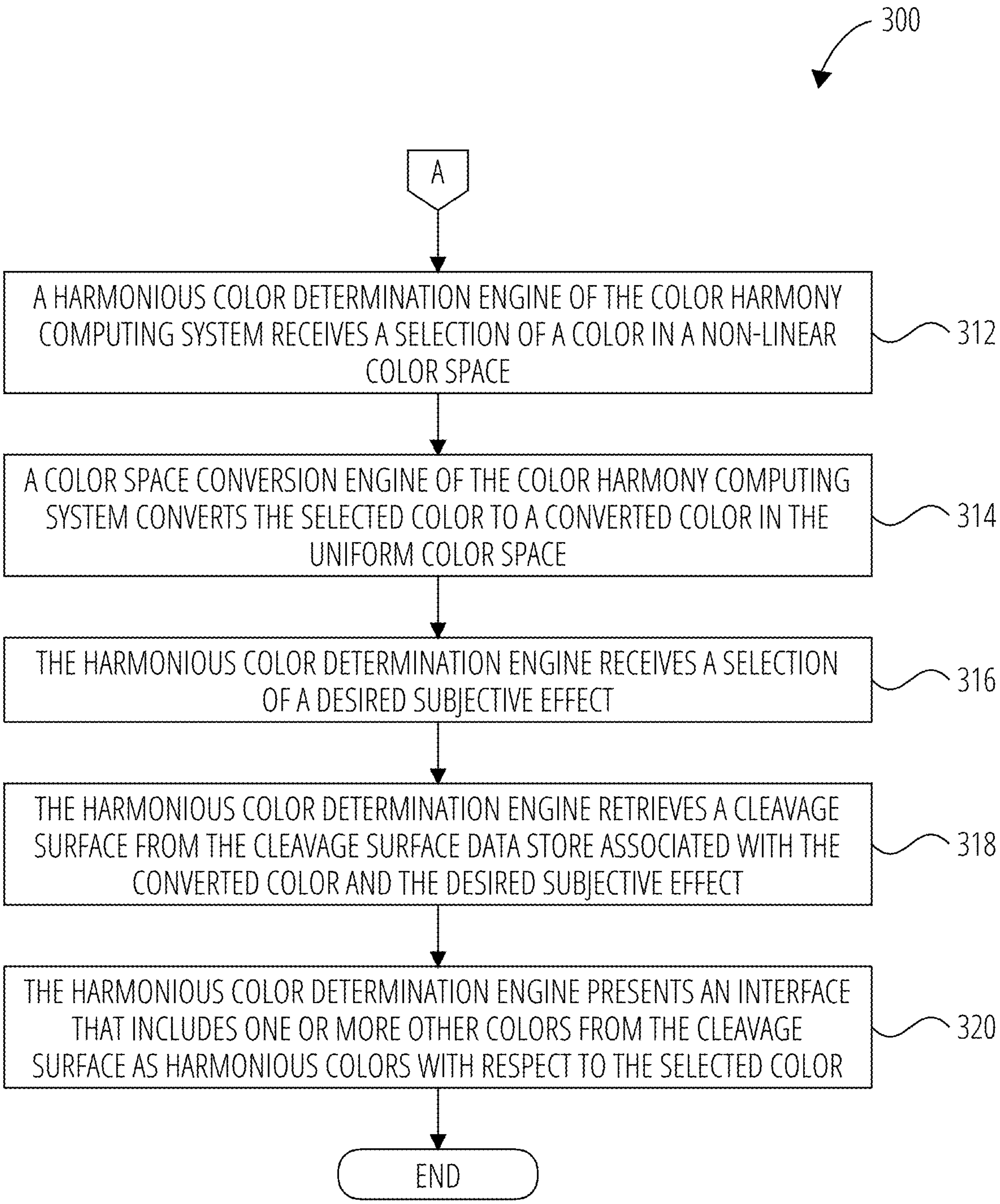

FIG. 3A-FIG. 3B is a flowchart that illustrates a non-limiting example embodiment of a method of automatically determining harmonious colors according to various aspects of the present disclosure.

From a start block, the method 300 proceeds to block 302, where a cleavage surface determination engine 212 of a color harmony computing system 102 receives data identifying a set of harmonious colors in a uniform color space. In some embodiments, the data identifying the set of harmonious colors may be provided in a different color space, including but not limited to a non-linear color space such as CIELAB or sRGB, and the colors from the non-linear color space may be converted to the uniform color space by the color space conversion engine 210.

The data may be received by the cleavage surface determination engine 212 in any suitable format. In some embodiments, the data may directly identify the colors of the set of harmonious colors (e.g., by providing coordinates in a color space). In some embodiments, the colors themselves may be identified. In some embodiments, cosmetic products or other objects may be identified, and the cleavage surface determination engine 212 may look up previously determined colors associated with the objects (e.g., experimentally measured colors of the objects) to identify the colors of the set of harmonious colors.

In some embodiments, the data may indirectly identify the colors of the set of harmonious colors in a way such that the cleavage surface determination engine 212 may extract the harmonious colors from the data. For example, in some embodiments, the data may include an image of a look, such as a selfie. The cleavage surface determination engine 212 may use computer vision techniques to perform face detection on the image, and to identify portions of the face associated with cosmetic products (e.g., lips, eyelids, etc.). The cleavage surface determination engine 212 may then sample colors within the portions of the face associated with cosmetic products in order to extract the harmonious colors from the image.

At block 304, the cleavage surface determination engine 212 determines a shape and a location of a cleavage surface in the uniform color space based on the set of harmonious colors. In some embodiments, the cleavage surface may be flat (a cleavage plane). In such embodiments, if the set of harmonious colors has three colors, then the location of the cleavage surface may be uniquely defined by the plane that intersects the three colors of the set of harmonious colors. In some embodiments, the cleavage surface may be parallel to one of the natural cleavage planes of the uniform color space, and may be moved in this orientation in order to find a best fit for the set of harmonious colors.

If the set of harmonious colors has more than three colors, then a regression analysis may be used to determine a plane that minimizes a distance from the set of harmonious colors. In some embodiments, the cleavage surface may be curved. In some embodiments, the cleavage surface determination engine 212 may determine a curved surface that passes through (or near) each of the colors of the set of harmonious colors.

At block 306, the cleavage surface determination engine 212 determines a subjective effect associated with the set of harmonious colors. In some embodiments, the data identifying the set of harmonious colors may be expressly labeled with the associated subjective effect (e.g., happy, moody, vibrant, subdued, etc.). In some embodiments, the cleavage surface determination engine 212 may determine the associated subjective effect based data accompanying the set of harmonious colors. For example, a social media post having an image that depicts the set of harmonious colors, a catalog page having an image depicting products having the set of harmonious colors, an advertisement having an image depicting products having the set of harmonious colors, a review of products representing the set of harmonious colors, or other data may include text that describes the associated image. The cleavage surface determination engine 212 may use natural language processing techniques, including but not limited to sentiment analysis, to extract a subjective effect indicated by the text.

At block 308, the cleavage surface determination engine 212 stores at least the shape of the cleavage surface and the subjective effect in a cleavage surface data store 208 of the color harmony computing system 102. The shape of the cleavage surface may be associated with the subjective effect. In other words, for a given color within the uniform color space, a cleavage surface of a first shape passing through the given color may identify harmonious colors to the given color that evoke a first subjective effect, while a cleavage surface of a second shape passing through the given color may identify harmonious colors to the given color that evoke a second subjective effect. As such, storing both the cleavage surface and the subjective effect determined to be evoked by the cleavage surface allows harmonious colors having desired subjective effects to be produced.

The method 300 then advances to a decision block 310, where a determination is made regarding whether more sets of harmonious colors should be processed. If it is determined that there are more sets of harmonious colors to be processed, then the result of decision block 310 is YES, and the method 300 returns to block 302 to process the next set of harmonious colors. Otherwise, the result of decision block 310 is NO, and the method 300 proceeds to a continuation terminal ("terminal A").

From terminal A (FIG. 3B), the method 300 proceeds to block 312, where a harmonious color determination engine 214 of the color harmony computing system 102 receives a selection of a color in a non-linear color space. In some embodiments, the selected color may be selected from a color picker presented by a computing device, such as end user computing device 104. Typically, computing devices present colors using non-linear color spaces such as sRGB or CIELAB, and so the selected color would be specified in the non-linear color space being used to present the color picker. In some embodiments, the selected color may be provided by a colorimeter or spectrophotometer configured to directly measure the color in the non-linear color space from a sample.

At block 314, a color space conversion engine 210 of the color harmony computing system 102 converts the selected color to a converted color in the uniform color space. There are techniques known to those of ordinary skill in the art for converting from certain non-linear color spaces, such as CIEXYZ, to uniform color spaces such as the OSA-UCS color space. In some embodiments, the color space conversion engine 210 may first convert the selected color from a first non-linear color space (e.g., CIELAB) to a second non-linear color space (e.g., CIEXYZ) for which a conversion to the OSA-UCS color space is available, and then from the second non-linear color space to the OSA-UCS color space using known techniques. The conversion of the selected color changes the values specified for the color in the non-linear color space (e.g., a perceptual lightness (L*) value, a green-red value (a*), and a blue-yellow value (b*) for CIELAB) to values for the color in the uniform color space (e.g., a lightness (L) value, a yellow-blue (j) value, and a green-red (g) value for the OSA-UCS color space).

At block 316, the harmonious color determination engine 214 receives a selection of a desired subjective effect. In some embodiments, the desired subjective effect may be specified via a user interface. In some embodiments, the desired subjective effect may be selected from a list of subjective effects for which cleavage surfaces are present in the cleavage surface data store 208.

At block 318, the harmonious color determination engine 214 retrieves a cleavage surface from the cleavage surface data store 208 associated with the converted color and the desired subjective effect. In some embodiments, the harmonious color determination engine 214 may filter the cleavage surfaces stored in the cleavage surface data store 208 based on the desired subjective effect, and may search for a cleavage surface with the desired subjective effect that passes through a location of the converted color in the uniform color space.

At block 320, the harmonious color determination engine 214 presents an interface that includes one or more other colors from the cleavage surface as harmonious colors with respect to the selected color. In some embodiments, the uniform color space may be associated with a scale at which colors are considered distinguishable. For example, in the OSA-UCS color space, colors that are a whole integer value apart from each other are considered distinguishable. Accordingly, the harmonious color determination engine 214 may present an interface that includes other colors on the cleavage surface that are at least a whole integer distance away from the selected color, as well as a whole integer distance away from each other. In some embodiments, the harmonious color determination engine 214 may present all of the colors within the cleavage surface that are whole integer distances away from the selected color and each other. In some embodiments, the harmonious color determination engine 214 may present colors within the cleavage surface that are associated with cosmetic products, to help guide selection of a cosmetic product of a harmonious color to the selected color. The interface may then accept a selection of one or more of the other colors, which may be used for any suitable purpose (selecting a product having the selected color, etc.).

The method 300 then advances to an end block and terminates.

Though the method 300 describes presentation of automatically generated harmonious colors for selection, this example should not be seen as limiting. In some embodiments, the harmonious color determination engine 214 could, given a start color (e.g., a hair color, a skin tone, etc.), automatically generate a catalog of products (e.g., eye shadow, lip color, etc.) that are harmonious with the hair color. In some embodiments, the harmonious color determination engine 214 could, given a product having a known color, automatically generate palettes that are harmonious with the known color with different subjective effects. The generated palettes (or individual colors from such a palette) could be provided to a custom formulation and dispensing device for fabrication of products having the automatically determined harmonious colors.

While illustrative embodiments have been illustrated and described, it will be appreciated that various changes can be made therein without departing from the spirit and scope of the disclosure.

The embodiments of the invention in which an exclusive property or privilege is claimed are defined as follows:

1. A computer-implemented method of automatically determining harmonious colors, the method comprising:

receiving, by a computing system, a selection of a color;

using, by the computing system, the selected color to retrieve a cleavage surface in a uniform color space; and presenting, by the computing system, one or more other colors from the cleavage surface as harmonious colors with respect to the selected color, wherein presenting the one or more other colors from the cleavage surface as harmonious colors with respect to the selected color includes:

presenting one or more other colors that are on the cleavage surface and are at least a whole integer value distant from the selected color and from each other.

2. The computer-implemented method of claim 1, wherein the selected color is in a non-linear color space, and wherein the method further comprises converting the selected color from the non-linear color space to the uniform color space.

3. The computer-implemented method of claim 2, wherein the non-linear color space is a CIELAB color space, and wherein the uniform color space is an Optical Society of America Uniform Color Scales (OSA-UCS) color space.

4. The computer-implemented method of claim 1, wherein using the selected color to retrieve the cleavage surface in the uniform color space includes:

determining a desired subjective effect; and using the selected color to retrieve a cleavage surface having a shape associated with the desired subjective effect.

5. The computer-implemented method of claim 1, further comprising:

receiving, by the computing system, data identifying a set of harmonious colors in the uniform color space;

determining, by the computing system, a cleavage surface of the uniform color space that includes the set of harmonious colors; and storing, by the computing system, the determined cleavage surface.

6. The computer-implemented method of claim 5, wherein the data identifying the set of harmonious colors in the uniform color space includes an image of a look and a text description of the look; and wherein the method further comprises:

determining, by the computing system, the set of harmonious colors using the image of the look;

determining, by the computing system, a shape and a location of a cleavage surface associated with the set of harmonious colors;

determining, by the computing system, a subjective effect of the look based on the text description; and storing, by the computing system, at least the shape of the cleavage surface in association with the subjective effect.

7. A non-transitory computer-readable medium having computer-executable instructions stored thereon that, in response to execution by one or more processors of a computing system, cause the computing system to perform actions for automatically determining harmonious colors, the actions comprising:

receiving, by the computing system, a selection of a color;

using, by the computing system, the selected color to retrieve a cleavage surface in a uniform color space; and presenting, by the computing system, one or more other colors from the cleavage surface as harmonious colors with respect to the selected color, wherein presenting the one or more other colors from the cleavage surface as harmonious colors with respect to the selected color includes:

presenting one or more other colors that are on the cleavage surface and are at least a whole integer value distant from the selected color and from each other.

8. The non-transitory computer-readable medium of claim 7, wherein the selected color is in a non-linear color space, and wherein the actions further comprise converting the selected color from the non-linear color space to the uniform color space.

9. The non-transitory computer-readable medium of claim 8, wherein the non-linear color space is a CIELAB color space, and wherein the uniform color space is an Optical Society of America Uniform Color Scales (OSA-UCS) color space.

10. The non-transitory computer-readable medium of claim 7, wherein using the selected color to retrieve the cleavage surface in the uniform color space includes:

determining a desired subjective effect; and using the selected color to retrieve a cleavage surface having a shape associated with the desired subjective effect.

11. The non-transitory computer-readable medium of claim 7, wherein the actions further comprise:

receiving, by the computing system, data identifying a set of harmonious colors in the uniform color space;

determining, by the computing system, a cleavage surface of the uniform color space that includes the set of harmonious colors; and storing, by the computing system, the determined cleavage surface.

12. The non-transitory computer-readable medium of claim 11, wherein the data identifying the set of harmonious colors in the uniform color space includes an image of a look and a text description of the look; and wherein the actions further comprise:

determining, by the computing system, the set of harmonious colors using the image of the look;

determining, by the computing system, a shape and a location of a cleavage surface associated with the set of harmonious colors;

determining, by the computing system, a subjective effect of the look based on the text description; and storing, by the computing system, at least the shape of the cleavage surface in association with the subjective effect.

13. A system comprising:

circuitry for receiving a selection of a color;

circuitry for using the selected color to retrieve a cleavage surface in a uniform color space; and circuitry for presenting one or more other colors from the cleavage surface as harmonious colors with respect to the selected color, wherein presenting the one or more other colors from the cleavage surface as harmonious colors with respect to the selected color includes:

presenting one or more other colors that are on the cleavage surface and are at least a whole integer value distant from the selected color and from each other.

14. The system of claim 13, wherein the selected color is in a non-linear color space;

wherein the system further comprises circuitry for converting the selected color from the non-linear color space to the uniform color space;

wherein the non-linear color space is a CIELAB color space; and wherein the uniform color space is an Optical Society of America Uniform Color Scales (OSA-UCS) color space.

15. The system of claim 13, wherein using the selected color to retrieve the cleavage surface in the uniform color space includes:

determining a desired subjective effect; and using the selected color to retrieve a cleavage surface having a shape associated with the desired subjective effect.

16. The system of claim 13, further comprising:

circuitry for receiving data identifying a set of harmonious colors in the uniform color space;

circuitry for determining a cleavage surface of the uniform color space that includes the set of harmonious colors; and circuitry for storing the determined cleavage surface.

17. The system of claim 16, wherein the data identifying the set of harmonious colors in the uniform color space includes an image of a look and a text description of the look; and wherein the system further comprises:

circuitry for determining the set of harmonious colors using the image of the look;

circuitry for determining a shape and a location of a cleavage surface associated with the set of harmonious colors;

circuitry for determining a subjective effect of the look based on the text description; and circuitry for storing at least the shape of the cleavage surface in association with the subjective effect.

* * * * *